United States Patent
Perotto et al.

(10) Patent No.: US 11,473,484 B2
(45) Date of Patent: Oct. 18, 2022

(54) AXIAL FLUID SPRAY NOZZLE WITH VENT VALVE

(71) Applicant: BONTAZ CENTRE R & D, Marnaz (FR)

(72) Inventors: Stéphane Pascal Perotto, Ayse (FR); Marc Eugène Talotti, Sallanches (FR)

(73) Assignee: BONTAZ CENTRE R & D, Marnaz (FR)

( * ) Notice: Subject to any disclaimer, the term of this patent is extended or adjusted under 35 U.S.C. 154(b) by 339 days.

(21) Appl. No.: 16/622,343

(22) PCT Filed: Jun. 12, 2018

(86) PCT No.: PCT/FR2018/051363
§ 371 (c)(1),
(2) Date: Dec. 13, 2019

(87) PCT Pub. No.: WO2018/229413
PCT Pub. Date: Dec. 20, 2018

(65) Prior Publication Data
US 2020/0200066 A1    Jun. 25, 2020

(30) Foreign Application Priority Data

Jun. 13, 2017   (FR) ..................................... 17 55313

(51) Int. Cl.
*F01P 3/08* (2006.01)
*F16K 15/02* (2006.01)
(Continued)

(52) U.S. Cl.
CPC .................. *F01P 3/08* (2013.01); *B05B 1/00* (2013.01); *B05B 1/3006* (2013.01);
(Continued)

(58) Field of Classification Search
CPC ....... B05B 1/00; B05B 1/3006; B05B 1/3026; F02M 61/16; F02M 57/025;
(Continued)

(56) References Cited

U.S. PATENT DOCUMENTS 3,794,248 A * 2/1974 Sherman ............... B05B 1/3006
239/570
3,948,285 A * 4/1976 Flynn .................... B05B 3/0472
239/570
(Continued)

FOREIGN PATENT DOCUMENTS

CN       202790713 U    3/2013
CN       104420927 A    3/2015
(Continued)

OTHER PUBLICATIONS

International Search Report for International Application No. PCT/FR2018/051363 dated Jul. 27, 2018.
(Continued)

*Primary Examiner* — Steven J Ganey
(74) *Attorney, Agent, or Firm* — Pearne & Gordon LLP (57) ABSTRACT

A spray nozzle comprising: a body comprising a duct, a seat arranged at the first end, and including an opening forming an inlet, a guide comprising a tubular jacket and a retaining member, the retaining member retaining the jacket in the duct, a plug mounted to slide axially in the channel of the jacket, the plug being pushed back against the opening by a spring, and in abutment against the bottom of the jacket, the guide comprising a radial vent, which comprises a vent channel isolated from the flow of fluid and connecting the inside of the guide jacket to a bore formed in the body of the spray nozzle.

21 Claims, 4 Drawing Sheets

(51) Int. Cl.
  *B05B 1/00* (2006.01)
  *F02M 57/02* (2006.01)
  *B05B 1/30* (2006.01)
  *F01P 3/00* (2006.01)
  *F01P 7/14* (2006.01)

(52) U.S. Cl.
  CPC ......... *B05B 1/3026* (2013.01); *F02M 57/025* (2013.01); *F02M 57/026* (2013.01); *F16K 15/026* (2013.01); *F01P 2003/006* (2013.01); *F01P 2007/146* (2013.01)

(58) Field of Classification Search
  CPC ................ F02M 57/026; F16K 15/026; F01P 2003/006; F01P 2007/146; F01P 3/08
  USPC .. 239/533.1, 533.2, 533.9, 533.15, 570, 571
  See application file for complete search history.

(56) References Cited

U.S. PATENT DOCUMENTS

| | | |
|---|---|---|
| 10,125,661 B2 | 11/2018 | Clement et al. |
| 2003/0005893 A1 | 1/2003 | Bontaz |
| 2008/0223318 A1 | 9/2008 | Perotto |
| 2013/0152883 A1 | 6/2013 | Perotto et al. |
| 2013/0192697 A1 | 8/2013 | Kajita et al. |
| 2015/0068471 A1 | 3/2015 | Schneider |
| 2016/0305562 A1 | 10/2016 | Kagomoto et al. |
| 2019/0063274 A1 | 2/2019 | Perotto et al. |

FOREIGN PATENT DOCUMENTS

| | | |
|---|---|---|
| DE | 100 41 324 A1 | 11/2001 |
| EP | 1 980 729 A1 | 10/2008 |
| EP | 2 549 159 A1 | 1/2013 |
| FR | 2827009 A1 | 1/2003 |
| JP | 2008232145 A | 10/2008 |
| JP | 2016205418 A | 12/2016 |
| WO | 2010/029085 A1 | 3/2010 |
| WO | 2014/167190 A1 | 10/2014 |

OTHER PUBLICATIONS

Written Opinion for International Application No. PCT/FR2018/051363 dated Jul. 27, 2018.
Preliminary French Search Report for French Patent Application No. 1755313 dated Dec. 14, 2017.
Office Action for Chinese Patent Application No. 201880039922.X dated Jun. 3, 2021.
Office Action for corresponding Japanese application No. 2019-568282 dated May 31, 2022.

\* cited by examiner

AXIAL FLUID SPRAY NOZZLE WITH VENT VALVE

TECHNICAL FIELD

This invention relates to a fluid distribution system, particularly an axial oil spray nozzle with vent valve. More particularly, this invention relates to an axial oil spray nozzle with vent valve designed for use in a hydraulic or pneumatic circuit in the automobile field, for example in a hydraulic circuit of an internal combustion engine, and even more particularly for cooling the pistons of the internal combustion engine.

PRIOR ART

Figure 1A:
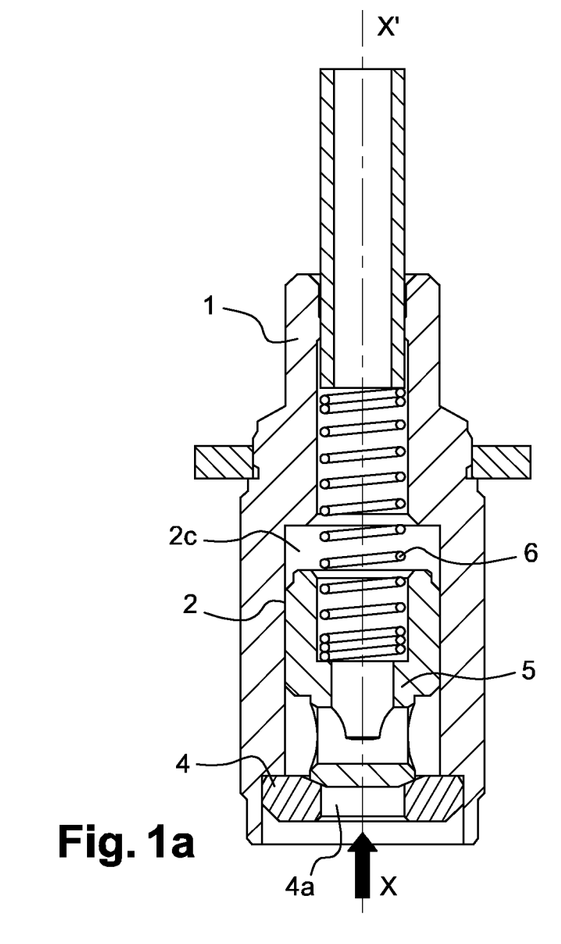
FIG. 1a is a diagrammatic representation on a longitudinal sectional plane, of an axial oil spray nozzle known in prior art, the valve being in the closed position.
Figure 1B:
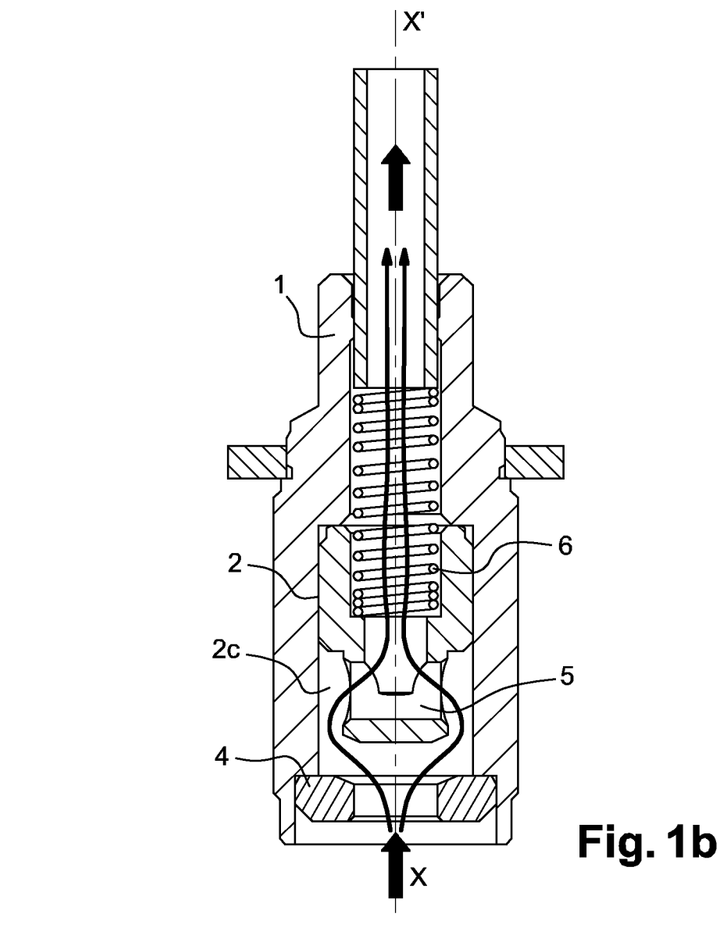
FIG. 1b is a diagrammatic representation on a longitudinal sectional plane, of an axial oil spray nozzle with valve, identical to that shown in FIG. 1a, known in prior art, the valve being in the open position, the arrows symbolizing the oil circulation direction.

FIGS. 1a and 1b represent an axial oil spray nozzle known in prior art and described in document FR 2827009.

This axial oil spray nozzle comprises:
- a nozzle body 1 comprising an internal conduit 2, extending along an elongation axis XX', comprising a first end 2a and a second end 2b, said conduit 2 being delimited by an internal surface 2c of the nozzle body 1,
- a valve seat 4 located at the second end 2b of the internal conduit 2, and comprising a port 4a forming an oil inlet to the oil spray nozzle,
- a plug 5, housed in the internal conduit 2 of the spray nozzle body and pushed in contact against the port in the valve seat 4 by a compression spring 6 bearing in contact with a stop installed in the internal conduit 2.

The plug, for example a piston (as shown in FIGS. 1a and 1b), is housed in the internal conduit 2, and cooperates with the valve seat 4. In particular, the plug is pushed by the compression spring 6 so as to close the port in the valve seat 4 as soon as the oil pressure is less than a predetermined pressure.

The oil spray nozzle with the plug in the closed position is shown in FIG. 1a. The plug then rests on the seat so as to block the inlet to the spray nozzle and thus prevent any oil circulation.

As soon as the oil pressure at the spray nozzle inlet is sufficient to overcome the force exerted on the plug by the compression spring, the plug is pushed inwards into the spray nozzle, and then releases the inlet to the spray nozzle (as shown on FIG. 1b). The result is an oil flow in the spray nozzle from the inlet to the outlet, symbolised by the arrows on FIG. 1b.

However, the axial oil spray nozzle known in prior art is not satisfactory.

In particular, this type of spray nozzle has an unstable and unpredictable behaviour.

In particular, when oil is flowing in the internal conduit 2, a back pressure opposite the direction of said flow is exerted on the plug, such that the behaviour of the plug is damaging to the life of the elements cooperating with the plug, and particularly the compression spring 6, the valve seat and the guide.

This back pressure also induces progressive opening of the valve that generates a large head loss during fluid flow. This head loss is harmful to the performances of the spray nozzle because it limits its flow.

Moreover, according to this configuration, the compression spring is directly on the oil flow passage, such that oil passes through this passage when the oil spray nozzle is open.

This oil passage in the spring disturbs its operation, reduces its mechanical reactivity, and can deform it or rotate it, which also accelerates its wear.

There is also another type of oil spray nozzle, called a radial oil spray nozzle, in which the internal conduit comprises a sudden Y-branch.

The radial dimensions of a radial oil spray nozzle are large.

Consequently, the radial configuration cannot be used whenever the oil spray nozzle must have a small radial dimension.

One purpose of this invention is to disclose an axial fluid spray nozzle with better reactivity than an axial fluid spray nozzle known in prior art.

Another purpose of this invention is to disclose an axial fluid spray nozzle for which the head loss is reduced, so that higher fluid jet velocities are possible at the same pressure.

Another purpose of this invention is to propose a more stable axial fluid spray nozzle with valve, the architecture of which can reduce or even annihilate the vibrational behaviour of the plug.

Finally, a final purpose of this invention is to disclose an axial fluid spray nozzle with valve that can be compact.

PRESENTATION OF THE INVENTION

The purposes mentioned above are at least partly achieved by an axial fluid spray nozzle with a vent valve comprising:
- a spray nozzle body comprising an internal conduit, extending along an elongation axis XX', said conduit having a symmetry of revolution about the elongation axis XX', comprising a first and a second end, and defined by an internal surface of the spray nozzle body, the second end forming a fluid outlet,
- a valve seat located at the first end of the internal conduit, comprising a port forming a fluid inlet to the spray nozzle,
- a valve guide comprising a tubular sleeve and a retaining element, the sleeve forming a channel, open at a first end, and closed by a bottom at a second end, the retaining element holding the sleeve in the internal conduit and coaxially with said conduit, the first end facing and being set beck from the port in the valve seat, the sleeve leaving a space between its peripheral surface and the internal surface of the spray nozzle body so as to enable fluid flow along a fluid flow direction, between the fluid inlet and outlet,
- a plug mounted free to slide axially in the channel of the sleeve, the plug being pushed into contact with the port in the valve seat by a compression spring, housed in the sleeve and stopped in contact with the bottom of the sleeve, so as to close off the port in the valve seat,
- the valve guide also comprising a radial vent, that comprises a vent channel isolated from the fluid flow in a leak tight manner, connecting the inside of the tubular guide sleeve at the reserve section, to a through radial drilling formed in the spray nozzle body.

According to one embodiment, a circumferential space is formed between an external tubular surface of the retaining element and the internal surface of the internal conduit, the circumferential space being isolated from the fluid flow in a leak tight manner, and creating a communication between the vent channel and the through radial drilling.

According to one embodiment, the mechanical connection between the annular segment and the sleeve comprises at least one spoke extending radially between the peripheral surface and an internal tubular surface of the annular segment.

According to one embodiment, axial sliding of the plug is limited by a valve stop at a sliding section of the sleeve opening up on the first end of the sleeve, and adjacent to a reserve section of the sleeve terminating by the bottom of the sleeve, the vent channel advantageously opening up in the channel of the sleeve at the reserve section.

According to one embodiment, the retaining element comprises an annular segment mechanically connected to the sleeve, in which the sleeve is coaxially engaged, coaxial engagement of the sleeve in the annular segment forming a sliding space between said segment and said sleeve, the annular segment comprising an external tubular surface comprising at least one circumferential surface section in circumferential contact with the internal surface of the spray nozzle body.

According to one embodiment, the internal conduit comprises a first tubular conduit section with one end coincident with the first end and another end at where there is a stop, the annular segment being housed in the first conduit section and stopped in contact with said stop in the fluid flow direction.

According to one embodiment, the arrangement of the annular segment blocked against the stop is made by a contact between an upper end of the annular segment and the stop, said contact being circumferential and leak tight, the circumferential contact between the circumferential surface section and the internal surface of the spray nozzle body also being leak tight, the stop advantageously being formed by a circumferential shoulder of the internal surface of the spray nozzle body.

According to one embodiment, the circumferential surface section extends from a lower end of the annular segment parallel to the elongation axis of the spray nozzle body, and is limited to a first fraction of the external tubular surface, a second fraction of the external tubular surface adjacent to said first fraction is at a distance from the internal surface of the spray nozzle body, the second fraction of the external tubular surface and the portion of internal surface of the spray nozzle body facing it form a leak tight circumferential space isolated firstly by the circumferential surface section and secondly by the leak tight circumferential contact between the upper end and the stop.

According to one embodiment, the vent channel of the radial vent comprises a radial channel formed from the reserve section passing radially through the volume of the spoke, and opening up in the circumferential space, and in which the through radial drilling also opens up on the internal surface of the spray nozzle body in the circumferential space.

According to one embodiment, the first tubular conduit section comprises a narrowed section extending from the stop, and in circumferential leak tight contact with a section of the second fraction of the tubular surface.

According to one embodiment, the valve guide is also fitted with centring fins extending radially to the peripheral surface of the sleeve, and in contact with the internal surface of the spray nozzle body, the fins advantageously prolonging the at least one spoke.

According to one embodiment, the fins extend beyond the first end of the sleeve and bear in contact with the seat so as to prevent any displacement of the valve guide along the elongation axis of the spray nozzle body.

According to one embodiment, the valve stop is formed by a circumferential shoulder on the internal surface of the sleeve.

According to one embodiment, the diameter of the sliding section of the sleeve is larger than the diameter of the reserve section so as to form the circumferential shoulder.

According to one embodiment, the position of the circumferential shoulder is adjusted so as to prevent the compression spring from having adjacent turns when the plug is stopped in contact with the valve stop.

According to one embodiment, the valve guide comprises a thermoplastic material.

According to one embodiment, the valve seat is crimped to the spray nozzle body.

According to one embodiment, the plug is a piston that has a piston end called the piston head, that will block the port in the valve seat and has a shape complementary to said port.

According to one embodiment, the piston head is provided with a chamfer.

According to one embodiment, the plug is a ball.

According to one embodiment, the spray nozzle also comprises a fluid distribution tube assembled on the body and held in place on it by shrink fitting, by brazing, by welding or by crimping at the outlet of the fluid spray nozzle.

The invention also relates to a hydraulic or pneumatic surface comprising at least one fluid spray nozzle, advantageously the hydraulic or pneumatic circuit being a circuit in an internal combustion engine.

BRIEF DESCRIPTION OF THE DRAWINGS

This invention will be better understood after reading the following description and the appended drawings on which:

FIG. 5a is a perspective representation of a valve seat that could be used in the oil spray nozzle according to this invention;

FIG. 5b is a diagrammatic representation of the valve seat on a diametric section plane;

FIG. 6a is a perspective bottom view of a valve guide that could be used in the oil spray nozzle according to this invention;

FIG. 6b is a diagrammatic representation of the valve guide in FIG. 6a, in a section plane along the XX' axis;

FIG. 6c is a perspective bottom view of the valve guide in FIG. 6a;

DETAILED PRESENTATION OF PARTICULAR EMBODIMENTS

The invention described in detail below makes use of an axial oil spray nozzle comprising a radially vented valve.

FIGS. 2 to 6c show an example embodiment of an axial oil spray nozzle 10 with vented valve according to this invention. This type of spray nozzle is particularly suitable for cooling a piston or for lubricating a chain of an internal combustion engine.

Figure 2:
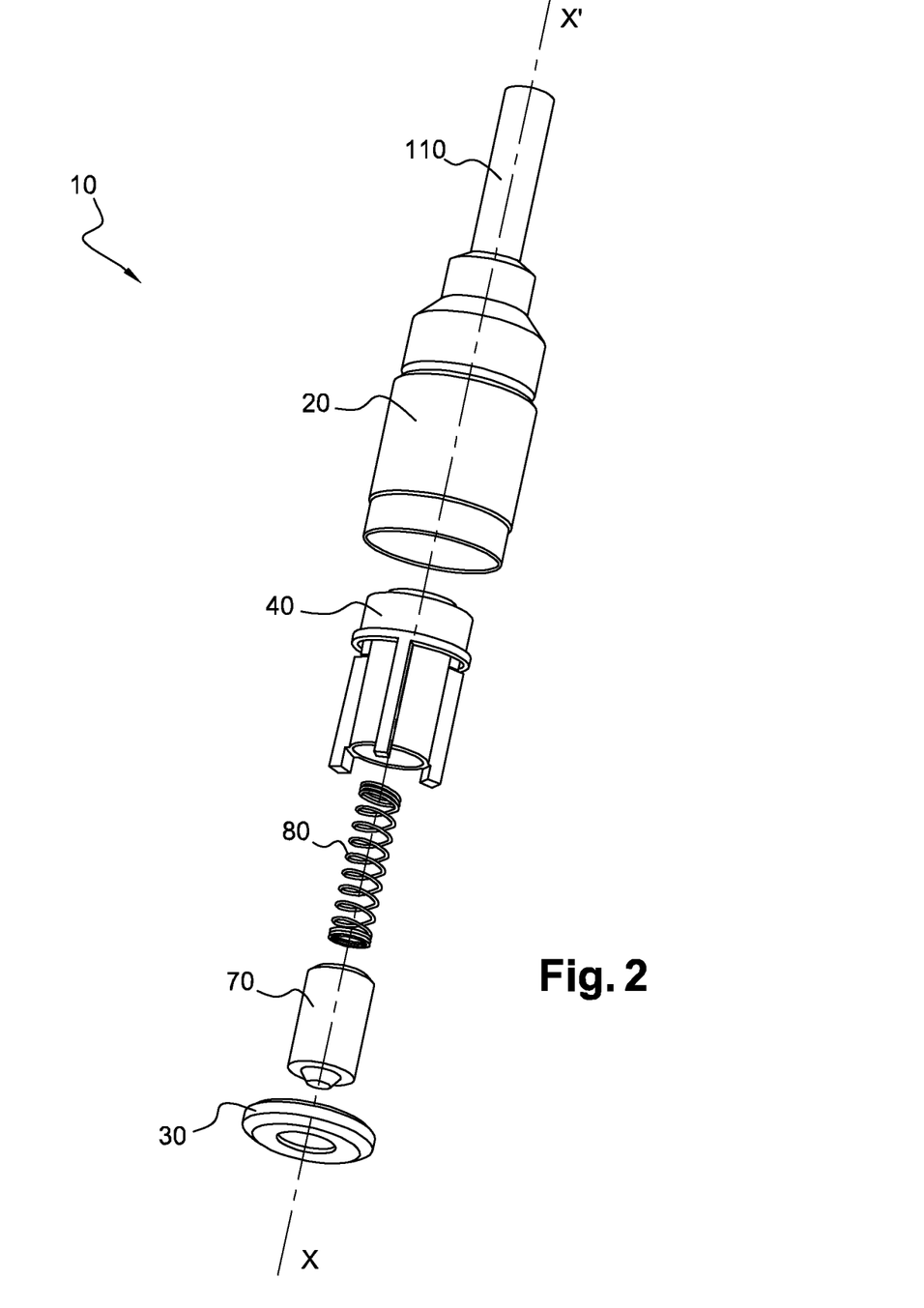
FIG. 2 is an exploded diagrammatic perspective representation of an axial oil spray nozzle with valve according to one embodiment of this invention.
Figure 3:
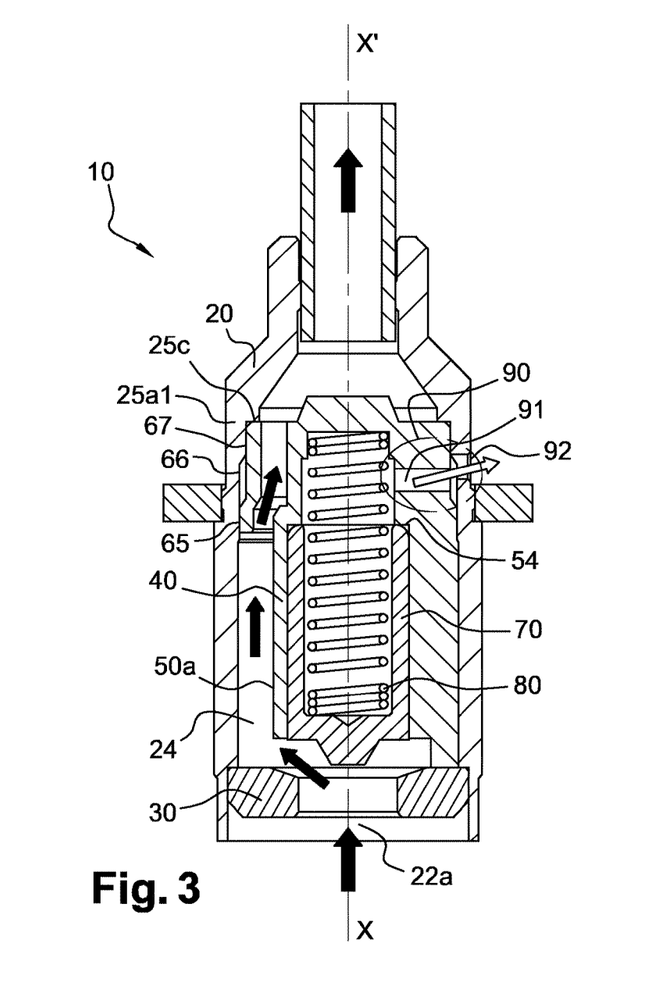
FIG. 3 is a diagrammatic representation on a longitudinal section plane (parallel to the elongation axis XX') of the axial oil spray nozzle with valve, according to one embodiment of this invention, the valve being in the open position and the arrows diagrammatically showing the oil flow in said spray nozzle.
Figure 4:
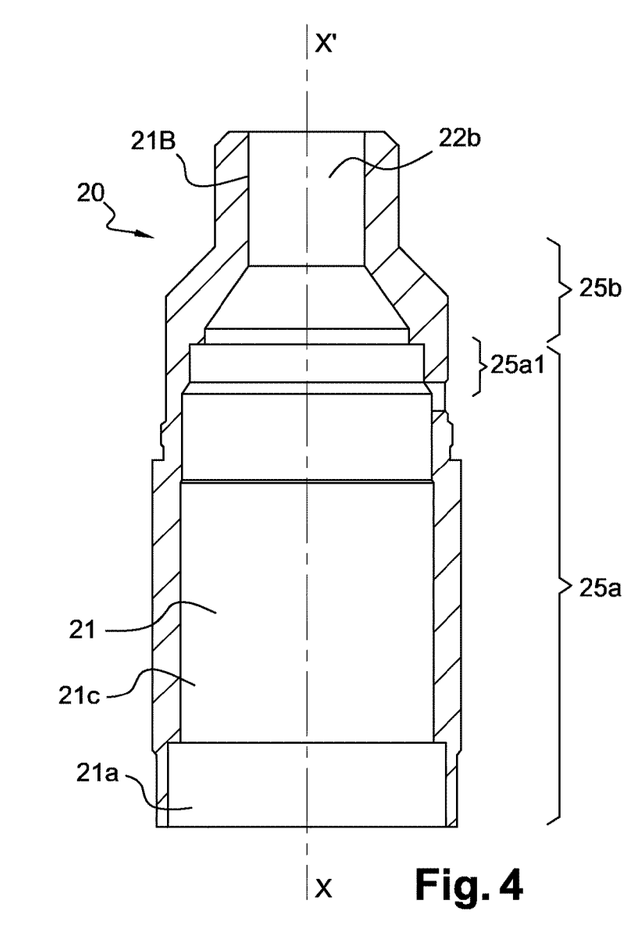
FIG. 4 is a diagrammatic representation on a longitudinal section plane (parallel to the elongation axis XX') of the spray nozzle body according to one particular embodiment of this invention.

On FIGS. 2 to 4, a spray nozzle body 20 is shown that comprises an internal conduit 21 (FIG. 4).

The internal conduit 21 extends along an elongation axis XX', and has a symmetry of revolution about said elongation axis XX'. The internal conduit 21 also comprises a first end 21a and a second end 21b, and is defined by an internal surface 21c of the spray nozzle body 20, the second end 21a forming an oil outlet 22b.

Throughout this presentation, an element or a section with symmetry of revolution about the elongation axis XX' may have a variable diameter. In other words, the internal conduit 21 may have sections with different diameters.

The spray nozzle body can preferably be made of a material that can resist stresses imposed by operation of an internal combustion engine. The spray nozzle body may be made of a metallic material.

For example, the spray nozzle body may include at least one material chosen from among steel, aluminium alloy, copper alloy, a thermoplastic material.

The oil sprinkler 10 also comprise a valve seat 30 (FIGS. 2, 3, 5a and 5b) arranged at the first end 21a of the internal conduit 21.

The valve seat comprises a port 31 (FIGS. 5a and 5b) forming an oil inlet 22a to the oil spray nozzle 10.

Figures 5A, 5B, 6A, 6B, 6C:
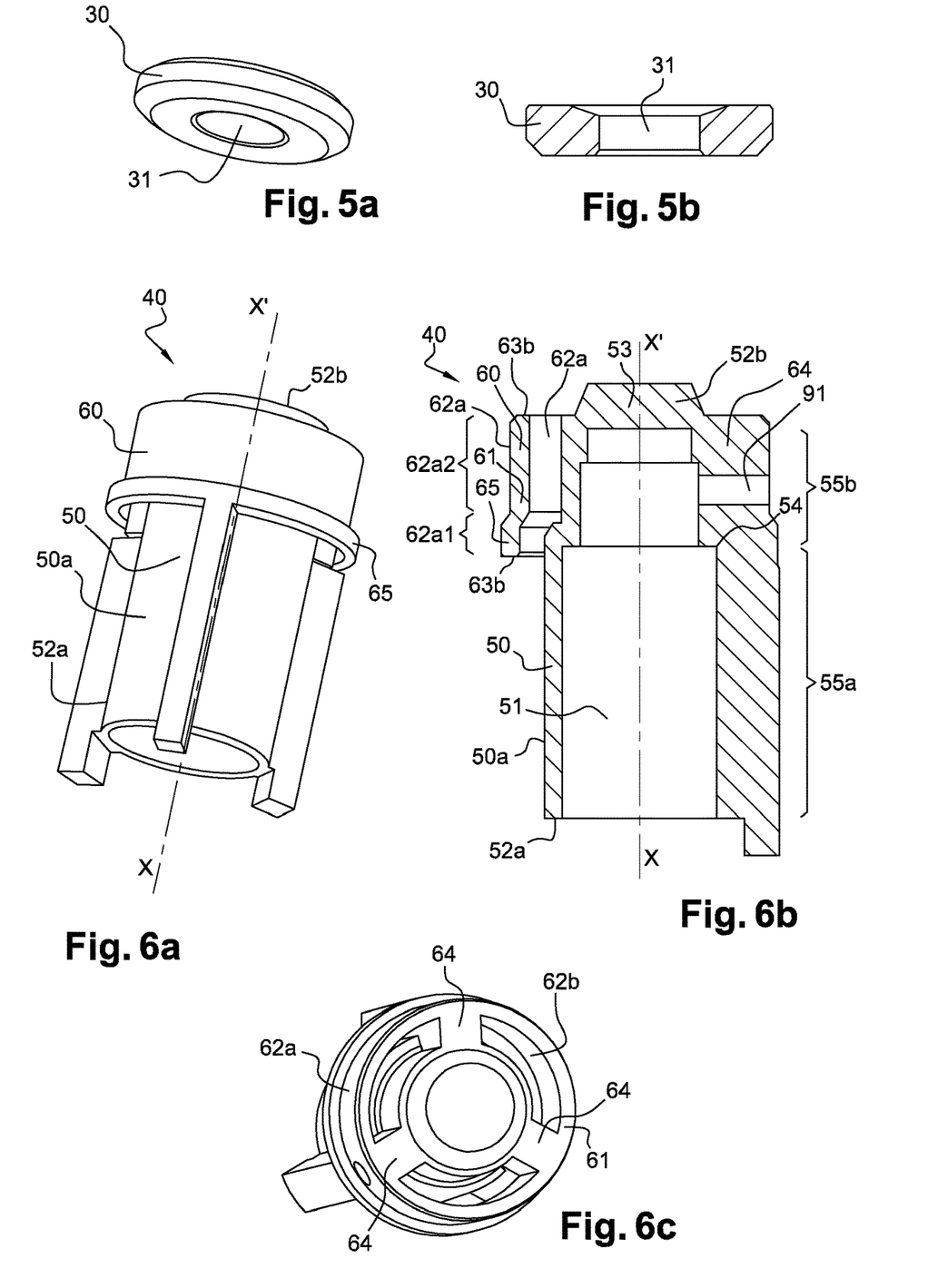

Without it being necessary to state it, the valve seat 30 is generally in the form of a disk that has a contour such that it can be inserted, with adjustment, into the internal conduit 21 of the spray nozzle body 20.

Furthermore, port 31 refers to a through drilling formed in the valve seat 30, and generally with symmetry of revolution about the elongation axis XX' of the spray nozzle body.

The valve seat 30 may include at least one material chosen from among steel, aluminium alloy, copper alloy, a thermoplastic material.

The valve seat 30 may be crimped to the spray nozzle body 10.

The oil spray nozzle 10 also comprises a valve guide 40.

The valve guide (FIGS. 2, 3, 6a to 6c) comprises a tubular sleeve 50 and a retaining element 60 (FIGS. 3, 6a and 6b).

The tubular sleeve 50 forms a channel 51, open at a first end 52a, and closed off by a bottom 53 at a second end 52b (FIG. 6b).

The retaining element 60 is adapted to retain the tubular sleeve 40 in the internal conduit 21 and coaxially with said conduit 21.

In other words, the retaining element 60 retains and centres the tubular sleeve 50 in the internal conduit 21.

Furthermore, the tubular sleeve 50 held in the internal conduit 21 leaves a space 24 between its peripheral surface 50a and the internal surface 21 of the spray nozzle body 10, so as to enable fluid flow between the oil inlet and outlet (FIG. 3).

Furthermore, the tubular sleeve 50 is retained by the retaining element 60 such that the first end 52a of the tubular sleeve 50 is placed facing and set back from the port 31 in the valve seat 30.

Without it being necessary to state it, the retaining element 60 also includes a fluid passage, for example the retaining element is perforated.

As illustrated in FIGS. 2 and 3, the oil spray nozzle 10 also comprises a plug 70 mounted free to slide axially in the channel 51 in the tubular sleeve 50.

Axial sliding means a plug 70 mounted to be adjusted by sliding in the channel 51 of the tubular sleeve 50. The sliding adjustment is leak tight and can be a few hundredths of a millimetre.

Furthermore, axial sliding of the plug 70 in the channel 51 of the tubular sleeve 50 can be limited by a valve stop 54 at a second sliding section 55a (FIG. 6b) of the tubular sleeve 50, opening up on the first end 52a of the tubular sleeve 50.

The sliding section 55a is adjacent to a reserve section 55b of the tubular sleeve 50 that terminates at the bottom 53 of the tubular sleeve 50 (FIG. 6b).

Furthermore, a compression spring 80 is housed in the channel 51 in the tubular sleeve 50.

The compression spring 80 bears against the bottom 53 of the tubular sleeve 50, and pushes the plug 70 in contact with the port 31 of the valve seat 30 so as to obstruct said port 31 (FIGS. 2 and 3).

During operation, the oil flow in the space 24 of the spray nozzle 10 is primed when the oil pressure at the inlet 22a to the spray nozzle 10 has reached a predetermined oil pressure.

The predetermined oil pressure is the pressure necessary to overcome the force exerted by the compression spring 80 on the plug 70, so as to make this plug slide in the channel 51 in the tubular sleeve 50, and thus release the port 31 in the valve seat 30.

Advantageously, the valve stop 54 is formed by a circumferential shoulder 54 on the internal surface of the tubular sleeve 50 (FIG. 3 and FIG. 6b).

Particularly advantageously, the inside diameter of the sliding section 55a of the tubular sleeve 50 can be larger than the inside diameter of the reserve section 55b so as to form the circumferential shoulder 54.

Also advantageously, the position of the circumferential shoulder can be adjusted so as to prevent the turns of the compression spring from coming into contact when the plug 70 is stopped in contact with the valve stop 54.

The valve guide 40 may include a thermoplastic material, and is advantageously formed by plastic injection.

The plug 70 may be a piston that has a piston end called the piston head, and that will block the port in the valve seat and has a shape complementary to said port.

Alternatively, the plug 70 can be a ball.

The valve guide 40 also comprises a radial vent 90, that comprises a vent channel 91 that connects the inside of the tubular sleeve 50 at the reserve section 55b, to a through radial drilling 92 formed in the spray nozzle body 10 (FIG. 3), in a leak tight manner. The vent channel 91 can include a pipe connecting the inside of the tubular sleeve to the radial drilling 92.

"Connects in a leak tight manner" means that oil flowing through the space 24 can enter neither the reserve section 55b, nor the radial vent 90.

A circumferential space 66 can be formed between an external tubular surface 62a of the retaining element 60 and the internal surface of the internal conduit 21, the circumferential space 66 being isolated from the fluid flow in a leak tight manner, and creating a communication between the vent channel 91 and the through radial drilling 92.

According to this configuration, the compression spring 80, that is located in the volume of the tubular sleeve, is also isolated from the fluid flow in a leak tight manner. Operation of the compression spring 80 is then not disturbed by the oil flow, so that a better quality oil jet can be obtained at the oil outlet 22b.

Moreover, this isolation of the compression spring 80 from the oil flow limits its wear.

Furthermore, the radial vent 90 makes the compression spring 80 much more stable, such that the opening mechanism of the oil spray nozzle is more predictable than in an oil spray nozzle without a vent.

Finally, the plug 70, according to this invention, is not subject to any back pressure from the oil flow such that its behaviour is both stable and predictable and faster when the pressure rises. The lack of any vibrational behaviour of the plug 70 when it is in contact against the stop 54 can also limit wear of the compression spring 80 and the valve in general.

According to one particular layout, the internal conduit 21 can comprise a first tubular conduit section 25a comprising one end coincident with the first end 21a and another end at which there is a stop 25c.

The internal conduit 21 can also comprise a second truncated cone shaped section 25b (FIG. 4) adjacent to the first conduit section 25a at the stop 25c.

Tubular conduit section or tubular surface means a section with symmetry of revolution about the elongation axis XX'.

Truncated cone shaped section means a section of a cone body. Moreover, according to this invention, the base of the truncated cone-shaped section can be prolonged by a portion of cylinder, the diameter of which is equal to the diameter of said base. The remainder of the description will be limited to a truncated cone-shaped section comprising a base, it being understood that the term base equally includes the base of a cone and a base prolonged by a portion of cylinder as defined above.

The second truncated cone-shaped section 25b can have a base diameter smaller that the diameter of the first tubular conduit section 25a so as to form a circumferential shoulder on the internal surface 21 of the spray nozzle body 10, the circumferential shoulder forming the stop 25c.

Still according to this particular arrangement, the through radial drilling 92 can be formed through the wall of the first tubular conduit section 25a.

The retaining element 60 may comprise an annular segment 61, mechanically connected to the sleeve 50, in which the sleeve 50 is coaxially engaged. The coaxial engagement of the sleeve 50 in the annular segment 61 is adapted to form a flow space between said segment 61 and sleeve 50.

The annular segment 61 may comprise an external tubular surface 62a comprising at least one circumferential surface section 65 in circumferential contact with the internal surface of the spray nozzle body 20.

In particular, the retaining element 60 may comprise two tubular surfaces, the external tubular surface 62a and a coaxial internal tubular surface 62b and connected at an upper end by an upper surface 63a and at a lower end by a lower surface (FIGS. 6b and 6c). The upper end 63a advantageously stops against the stop 25c, along the oil flow direction.

The oil flow direction means the flow of oil from the inlet to the outlet of the oil spray nozzle.

The diameter of the internal tubular surface 62b is adjusted to hold said internal tubular surface 62b at a distance from the peripheral surface 50a of the tubular sleeve 60. In other words, the annular segment 61 of the retaining element does not obstruct the oil passage 24.

The annular segment 61 can surround the tubular sleeve 50 at its reserve section 55b.

It is significant that the annular segment 61 reduces the space in which oil flows. In order to compensate for this effect, the outside diameter of the reserve section 55b can be less than the outside diameter of the sliding section 55a. In other words, the peripheral surface 50a of the tubular sleeve 50 has two adjacent peripheral surface sections with different diameters. The first of the two sections, called the first peripheral surface section, extends from the first end 52a, and the second called the second peripheral surface section and with a diameter less than the diameter of the first peripheral surface section terminates at the second end 52b. Thus, the internal tubular surface 62b is facing and at a distance from the second peripheral surface section.

Furthermore, the annular segment 61 is mechanically connected to the tubular sleeve 50 by at least one spoke 64, for example two spokes 64 or even three spokes 64 (FIGS. 6b and 6c).

The spoke 64 extends radially between the peripheral surface 50a of the tubular sleeve 50 and the internal tubular surface 62b. In particular, the spoke 64 makes a radial mechanical connection between the peripheral surface of the reserve section 55b and the internal tubular surface 62a.

Moreover, the upper surface 63a is in circumferential contact with the shoulder 25c of the internal surface 21.

The external tubular surface 62a may comprise at least one circumferential surface section 65 in circumferential contact with the internal surface of the spray nozzle body 20. In particular, the circumferential contact can be leak tight.

The circumferential surface section 65 can extend from the lower end of the annular segment 61, parallel to the elongation axis XX' of the spray nozzle body 10. The circumferential surface section 65 also extends along a first fraction 62a1 of the external tubular surface 62a (FIGS. 6a and 6b).

The external tubular surface 62a also comprises a second fraction 62a2 of the external tubular surface 62a, adjacent to said first fraction 62a1, that is at a distance from the internal surface 21 of the spray nozzle body 10.

Thus, the second fraction 62a2 of the external tubular surface 62a and the portion of internal surface of the spray nozzle body facing it form a circumferential space 66 isolated firstly by the circumferential surface section 65, and secondly by the leak tight contact between the upper surface 63a and the shoulder 25c of the internal surface 2, in a leak tight manner (FIG. 3).

"Isolated in a leak tight manner" means isolated from the oil flow and the pressure that the oil flow can generate.

The radial vent channel 91 and the drilling 92 advantageously open up in the circumferential space 66. This configuration is particularly advantageous, because it makes it possible to relax alignment constraints and/or constraints on adjustment of the radial vent channel 91 relative to the drilling 92. The method of fabricating elements forming part of the spray nozzle body and assembling them is then simplified.

As a very advantageous non-limitative example, the radial vent channel 91 may comprise a radial channel formed starting from the reserve section 55b, passing radially through the volume of the spoke 64, and opening up in the circumferential space 66 (FIGS. 3 and 6b).

Otherwise, said vent channel is isolated from the oil flow in the oil spray nozzle in a sealed manner.

The first conduit section 25a comprises a narrowed section 25a1 that extends from the shoulder 25c parallel to the elongation axis XX'. Furthermore, the narrowed section 25a1 is in leak tight circumferential contact with a section 67 of the second fraction 62a2 of the external tubular surface 62a, the section 67 extending starting from the upper end 63a parallel to the elongation axis of the spray nozzle body 10 (FIG. 3).

It is also understood that the narrowed section 25a1 is adjusted conservatively so as to preserve the circumferential space. In other words, there is no contact between the circumferential surface section 65 and the narrowed section 25a1.

The valve guide 40 can advantageously be provided with centring fins 100 extending radially from the peripheral surface 50a of the tubular sleeve 50, and in contact with the internal surface 21 of the spray nozzle body 10.

The extent of the centring fins 100 is adjusted to fine tune coaxial retention of the tubular sleeve 50 inside the spray nozzle body 20 (FIGS. 3, 6a and 6b).

Advantageously, each of the centring fins 100 advantageously prolongs a spoke chosen among the at least one spoke 64, and the space between two centring fins 100 delimits a flow channel.

Advantageously, the centring fins 100 also bear on the valve seat 30 to prevent any displacement of the valve guide along the elongation axis of the spray nozzle body.

This bearing of the centring fins 100 is obtained by prolonging said fins 100 beyond the first end 52a.

More particularly, bearing of the centring fins 100 against the valve seat 30 is adapted to not obstruct the port 31.

Bearing of the centring fins 100 against the valve seat prevents any movement of the valve guide 40 along the elongation axis XX'.

The spray nozzle may also comprise an oil distribution tube assembled on the body and held in place on the body by shrink fitting, by brazing, by welding or by crimping at the oil spray nozzle outlet.

During operation, the oil spray nozzle is opened by displacement of the plug 70 along the elongation axis XX' under the action of an oil pressure at the oil inlet.

During its displacement, the plug 70 compresses the compression spring 80 and reduces the space in which it is located. The radial vent 90 prevents an overpressure from being created in this volume that could disturb operation of the spring. Displacement of the plug is then more reactive, and the device according to this arrangement can achieve a fast increase in the oil flow.

The invention also relates to an axial oil spray nozzle with vent valve that will be used in a hydraulic or pneumatic circuit, for example in the automobile industry, comprising at least one spray nozzle with vented valve, as described above.

For example, the oil spray nozzle with vented valve can be used in the hydraulic circuit of an internal combustion engine, particularly for cooling the pistons of the internal combustion engine.

The spray nozzle according to this invention can also be used for cooling by air jet, for example in an air conditioning system.

The invention claimed is:

1. Axial spray nozzle with vented valve, comprising:
a spray nozzle body comprising an internal conduit, extending along an elongation axis XX', said internal conduit having a symmetry of revolution about the elongation axis XX', comprising a first end and a second end, and defined by an internal surface of the spray nozzle body, the second end forming a fluid outlet,
a valve seat located at the first end of the internal conduit, comprising a port forming a fluid inlet to the spray nozzle,
a valve guide comprising a tubular sleeve and a retaining element, the tubular sleeve forming a channel, open at a first end, and closed by a bottom at a second end, the retaining element holding the tubular sleeve in the internal conduit and coaxially with said internal conduit, the first end facing and being set back from the port in the valve seat, the tubular sleeve leaving a space between its peripheral surface and the internal surface of the spray nozzle body so as to enable fluid flow along a fluid flow direction, between the fluid inlet and outlet,
a plug mounted free to slide axially in the channel of the tubular sleeve, the plug being pushed into contact with the port in the valve seat by a compression spring, housed in the tubular sleeve and stopped in contact with the bottom of the tubular sleeve, so as to close off the port in the valve seat,
the valve guide also comprising a radial vent, that comprises a vent channel isolated from the fluid flow in a leak tight manner, connecting the inside of the tubular sleeve at a reserve section of the tubular sleeve, to a through radial drilling formed in the spray nozzle body,
wherein a circumferential space is formed between an external tubular surface of the retaining element and the internal surface of the internal conduit, the circumferential space being isolated from the fluid flow in a leak tight manner, and creating a communication between the vent channel and the through radial drilling.

2. Spray nozzle according to claim 1, wherein the valve seat is crimped to the spray nozzle body.

3. Spray nozzle according to claim 1, wherein the plug is a piston that has a piston end called a piston head, that will block the port in the valve seat and has a shape complementary to said port.

4. Hydraulic or pneumatic circuit comprising at least one spray nozzle according to claim 1.

5. An axial spray nozzle, with vented valve, comprising:
a spray nozzle body comprising an internal conduit, extending along an elongation axis XX', said internal conduit having a symmetry of revolution about the elongation axis XX', comprising a first end and a second end, and defined by an internal surface of the spray nozzle body, the second end forming a fluid outlet,
a valve seat located at the first end of the internal conduit, comprising a port forming a fluid inlet to the spray nozzle,
a valve guide comprising a tubular sleeve and a retaining element, the tubular sleeve forming a channel, open at a first end, and closed by a bottom at a second end, the retaining element holding the tubular sleeve in the internal conduit and coaxially with said internal conduit, the first end facing and being set back from the port in the valve seat, the tubular sleeve leaving a space between its peripheral surface and the internal surface of the spray nozzle body so as to enable fluid flow along a fluid flow direction, between the fluid inlet and outlet,
a plug mounted free to slide axially in the channel of the tubular sleeve, the plug being pushed into contact with the port in the valve seat by a compression spring, housed in the tubular sleeve and stopped in contact with the bottom of the tubular sleeve, so as to close off the port in the valve seat, the valve guide also comprising a radial vent, that comprises a vent channel isolated from the fluid flow in a leak tight manner, connecting the inside of the tubular sleeve at a reserve section of the tubular sleeve, to a through radial drilling formed in the spray nozzle body, wherein axial sliding of the plug is limited by a valve stop at a sliding section of the tubular sleeve opening up on the first end of the tubular sleeve, and adjacent to the reserve section of the tubular sleeve terminating by the bottom of the tubular sleeve.

6. Spray nozzle according to claim 5, wherein the retaining element comprises an annular segment mechanically connected to the tubular sleeve, in which the tubular sleeve is coaxially engaged, coaxial engagement of the tubular sleeve in the annular segment forming a sliding space between said segment and said tubular sleeve, the external tubular surface comprising at least one circumferential surface section in circumferential contact with the internal surface of the spray nozzle body.

7. Spray nozzle according to claim 6, wherein the mechanical connection between the annular segment and the tubular sleeve comprises at least one spoke extending radially between the peripheral surface and an internal tubular surface of the annular segment.

8. Spray nozzle according to claim 7, wherein the internal conduit comprises a first tubular conduit section comprising one end coincident with the first end of the internal conduit and another end at where there is a stop, the annular segment being housed in the first conduit section and stopped in contact with said stop in the fluid flow direction.

9. Spray nozzle according to claim 8, wherein the arrangement of the annular segment blocked against the stop is made by a contact between an upper end of the annular segment and the stop, said contact being circumferential and leak tight, the circumferential contact between the circumferential surface section and the internal surface of the spray nozzle body also being leak tight.

10. Spray nozzle according to claim 9, wherein the circumferential surface section extends from a lower end of the annular segment parallel to the elongation axis of the spray nozzle body, and is limited to a first fraction of the external tubular surface, a second fraction of the external tubular surface adjacent to said first fraction is at a distance from the internal surface of the spray nozzle body, the second fraction of the external tubular surface and the portion of internal surface of the spray nozzle body facing it form the leak tight circumferential space isolated firstly by the circumferential surface section and by the leak tight circumferential contact between the upper end and the stop.

11. Spray nozzle according to claim 10, wherein the vent channel of the radial vent comprises a radial channel formed from the reserve section passing radially through the volume of the spoke, and opening up in the circumferential space, and in which the through radial drilling also opens up on the internal surface of the spray nozzle body in the circumferential space.

12. Spray nozzle according to claim 11, wherein the first tubular conduit section comprises a narrowed section extending from the stop, and in circumferential leak tight contact with a section of the second fraction of the tubular surface.

13. Spray nozzle according to claim 11, wherein the valve guide is also fitted with centering fins extending radially to the peripheral surface of the tubular sleeve, and in contact with the internal surface of the spray nozzle body.

14. Spray nozzle according to claim 13, wherein the fins extend beyond the first end of the tubular sleeve and bear in contact with the seat so as to prevent any displacement of the valve guide along the elongation axis of the spray nozzle body.

15. Spray nozzle according to claim 5, wherein the valve stop is formed by a circumferential shoulder on the internal surface of the tubular sleeve.

16. Spray nozzle according to claim 15, wherein the diameter of the sliding section of the tubular sleeve is larger than the diameter of the reserve section so as to form the circumferential shoulder.

17. Spray nozzle according to claim 15, wherein the position of the circumferential shoulder is adjusted so as to prevent the compression spring from having adjacent turns when the plug is stopped in contact with the valve stop.

18. Spray nozzle according to claim 15, wherein the valve guide comprises a thermoplastic material.

19. Spray nozzle according to claim 5, wherein the valve seat is crimped to the spray nozzle body.

20. Spray nozzle according to claim 5, wherein the plug is a piston that has a piston end called a piston head, that will block the port in the valve seat and has a shape complementary to said port.

21. Hydraulic or pneumatic circuit comprising at least one spray nozzle according to claim 5.

* * * * *